May 26, 1925.  
M. G. NIXON  
1,539,763  
METHOD OF CONSTRUCTING ASPHALT PAVEMENTS  
Filed July 5, 1921

Witnesses  
Ansley Flowers  
Herbert L. Ware

Inventor  
Miles G. Nixon

Patented May 26, 1925.

1,539,763

UNITED STATES PATENT OFFICE.

MILES G. NIXON, OF BRIDGETON, NEW JERSEY.

METHOD OF CONSTRUCTING ASPHALT PAVEMENTS.

Application filed July 5, 1921. Serial No. 482,506.

*To all whom it may concern:*

Be it known that I, MILES G. NIXON, a citizen of the United States, residing at Bridgeton, in the county of Cumberland and State of New Jersey, have invented certain new and useful Improvements in Methods of Constructing Asphalt Pavements, of which the following is a specification.

This invention relates to methods of constructing asphalt pavements and particularly to methods of producing a firm and permanent bond between a foundation of cement concrete or other suitable material and a superposed wearing surface of asphalt concrete.

Heretofore it has been common practice to apply to the cement concrete or other foundation a so-called "paint coat" consisting of asphalt or similar material dissolved in naphtha or other volatile solvent. The intended effect of this treatment is to apply to the surface of the foundation an adherent coat of asphalt with which the asphalt binder of the superposed asphalt concrete will coalesce thus producing a permanent bond between the base and the asphalt concrete. Much difficulty has, however, been experienced, for the reason that the paint coat will not adhere to the base or foundation if this contains any substantial quantity of moisture. This fact entailed serious difficulty and loss of time in the case of fresh concrete foundations and was an almost insurmountable difficulty in cases where it was desired to lay an asphalt concrete surface directly upon old pavements of brick, cobblestone or water bound macadam.

Heretofore a number of specifically different preparations, all consisting essentially of emulsions of oils, fats, tar, asphalt etc., in water, have been used as binders in producing asphalt concrete, and as surface binders for sprinkling on roads. For lack of a better term I designate these as asphaltic binders of the aqueous type. One of these binders, with which I am familiar, is manufactured in substantial accordance with the disclosure in the patent to L. S. van Westrum 992,313, granted May 16, 1911. This binder is characterized by the presence of a volatile saponifying agent, usually ammonia, whose evaporation permits the emulsion to break down, so that the asphaltic particles coalesce. Certain other asphalt binders of the aqueous type contain fixed alkalis, as the saponifying agent, and in these the breaking down of the emulsion is probably due to slightly different reactions, but is the same, or substantially the same, in effect.

When asphalt concretes made with asphaltic binders of the aqueous type are laid on a cement concrete base these binders bond the cement base to the asphalt concrete. This was known prior to my invention.

The present invention is based on the discovery that aqueous asphaltic binders can be used to apply an adherent coating of asphalt or the like to almost any porous or stony base, even when wet, and that the coating so applied is in condition to coalesce with the binder of a superposed layer of a specifically different asphaltic concrete, i. e., one in which the binder is of the non-aqueous type. By binder of the non-aqueous type I mean to exclude all watery emulsions, solutions or suspensions of tar, asphalt, etc., and to include ordinary tars, asphalts, etc., and non-aqueous mixtures containing the same. Most such binders are mixed with the stone while in a heated condition and are laid while still hot, but certain of them may be laid after they have cooled.

The accompanying drawing illustrates diagrammatically the characteristic features of former constructions and their modification in accordance with my improved method.

Figure 1:
Fig. 1 shows in cross-section an asphaltum paved road of usual construction.

In Fig. 1, A is a solid foundation of Portland cement concrete, water-bound macadam, brick, cobble stone or any other suitable material. All these foundations have been used and the exact nature of the foundation is not material to the present invention. B is a wearing surface consisting of a mineral aggregate mixed with a non-aqueous bitumen which is usually hot when applied to the surface of the foundation A. The construction shown in Fig. 1 has proven to be a good and lasting construction provided the surface of the foundation A is thoroughly dry when the layer B is applied. When this is not the case, and it most frequently is not, the wearing surface adheres imperfectly to the foundation or not at all, so that it soon strips from the foundation. This leads to the early destruction of the paving. To remedy this trouble is the object of my invention.

Figure 2:
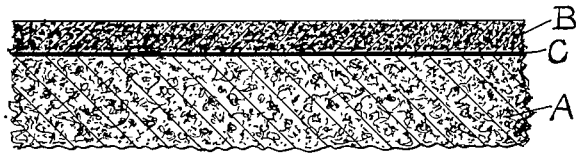
Fig. 2 illustrates a similar construction modified by the use of my improved method.

In Fig. 2, A and B represent the foundation and the superposed layer exactly as described with reference to Fig. 1, but, to produce a lasting bond between the foundation A and the layer B, there is interposed a thin layer C of aqueous bitumen. This is applied to the surface of the foundation A before the application of the wearing surface B. The layer C produces a strong and permanent bond whether the layer A be wet or dry when the layer C is applied.

The above being the general principle of the invention, specific examples will now be described for the reason that the best mode of applying the bonding layer C varies according to the nature of the foundation.

Assuming that it is desired to lay an asphalt concrete wearing surface upon a cement base already prepared, I first apply to the base with a brush, or in any other suitable manner, a coating of an aqueous asphaltic binder. Thereafter, and preferably after such interval of time as will permit the breaking down of the emulsion and the coalescing of the asphalt particles, in the manner characteristic of the particular aqueous binder used, I lay upon the base a layer of any non-aqueous asphalt concrete. I prefer those types of asphalt concrete which are laid hot, but can use with success those which are laid at atmospheric temperature.

Where it is desired to lay an asphalt concrete wearing surface upon an old road such as a brick or cobble-stone road the procedure is substantially the same as above described except that before the emulsion of asphalt or the like is applied the hollows in the road are preferably filled up with cement concrete to give a true and relatively smooth foundation. As before stated the emulsion is best applied with a brush.

Where it is desired to lay an asphalt concrete wearing surface upon a water bound macadam road, or the like, I find it desirable first to sprinkle the road with a quite dilute preparation of the aqueous asphaltic binder. This sprinkling operation may be repeated one or more times preferably with less dilute solutions of the binder. The sprinkling with these dilute solutions results in penetration of the road surface and the binding together thereof, the extra water causing free flow from the sprinkler and also better penetration of the road. At the conclusion of the sprinkling operations the asphalt concrete may be laid, but since the aqueous binder can be applied in a thicker condition by means of a brush than by means of any sprinkling apparatus known to me I prefer to give the surface a final brush coat before applying the wearing surface of asphalt concrete.

In all the examples above specified it appears not to be absolutely necessary to await the evaporation of the water from an emulsion with fixed alkali, or the water and ammonia as the case may be before applying the asphalt concrete. However when there is time for it I prefer to do so.

The invention offers decided practical advantages for the reason that the asphalt concrete can be laid on a relatively green concrete base, and because it avoids the necessity of awaiting a succession of good drying days before laying asphalt on any base. It also results in economy because it avoids the use of the artificial drying means such as blast heaters and the like which have heretofore been used to some extent to dry surfaces preparatory to the application of the paint coat. Furthermore an aqueous emulsion can be prepared at less expense than a solution of asphalt in naphtha, and since it produces an effective bonding coat regardless of moisture in the base it avoids the danger (always present when asphalt dissolved in naphtha is used) of the existence of hidden defects due to poor bonding.

In the claims I use the word "asphaltic" as a generic term to include, asphalts, tars and like binders. I also use the term "volatile saponifying agent" to designate the ammonia or its equivalent whose presence is characteristic of the binder made according to the van Westrum patent. I use the word "emulsion" to define any suspension in water of the asphaltic material believing that this term most aptly defines the nature of such suspensions. I am aware, however, that the nature of such suspensions has been the subject of controversy and use the term in a generic sense and not as a limiting expression.

What is claimed is:—

1. The method of constructing pavements which consists in preparing a suitable foundation; coating the surface of said foundation with an aqueous emulsion of an asphaltic binder; and then superposing a layer of non-aqueous asphaltic concrete.

2. The method of constructing pavements which consists in preparing a suitable foundation, sprinkling said foundation with a dilute aqueous emulsion of an asphaltic binder to penetrate and bind the surface and after this has sufficiently set adding a thicker coat of the same binder with a brush to produce an adhesive layer of such asphaltic binder and then superimposing a layer of non-aqueous asphaltic concrete.

3. The method of constructing pavements which consists in preparing a suitable foundation; sprinkling said foundation a plurality of times with an aqueous emulsion of asphaltic binder, such emulsion being varied in concentration so as to contain a relatively larger quantity of binder in the later sprinklings than in the earlier; and then superposing a layer of non-aqueous asphaltic concrete.

4. The method of constructing pavements which consists in preparing a suitable foundation; coating the surface of said foundation with an aqueous emulsion of an asphaltic binder; and then after an interval of time, during which the coalescing of the asphalt particles occurs, superposing a layer of non-aqueous asphaltic concrete.

5. The method of constructing pavements which consists in preparing a suitable foundation; coating the surface of said foundation with an aqueous emulsion of an asphaltic binder, said emulsion containing a volatile saponifying agent; and then after an interval of time, during which the evaporation of said volatile saponifying agent has been permitted to take place, superposing a layer of non-aqueous asphaltic concrete.

6. The method of constructing pavements which consists in preparing a suitable foundation; coating the surface of said foundation with an aqueous emulsion of an asphaltic binder; then superposing a layer of hot asphaltic concrete; and finally compacting said concrete.

7. The method of securing adhesion between a non-aqueous asphaltic binder and substances bearing moisture, which consists in first coating such substance with an aqueous emulsion of an asphaltic binder, and then applying the non-aqueous asphaltic binder.

8. The method of securing adhesion between a non-aqueous asphaltic binder and substances bearing moisture which consists in first coating such substances with an aqueous emulsion of an asphaltic binder, said emulsion containing a volatile saponifying agent, and then applying the non-aqueous asphaltic binder.

In testimony whereof I have signed my name to this specification.

MILES G. NIXON.